United States Patent Office 2,816,899
Patented Dec. 17, 1957

2,816,899

3-BENZHYDRYL-4-HYDROXYCOUMARINS AND THEIR PREPARATION

Edgar Enders and Adam Müller, Leverkusen, Germany, assignors to Farbenfabriken Bayer Aktiengesellschaft, Leverkusen, Germany, a corporation of Germany No Drawing. Application August 10, 1956,
Serial No. 603,245

Claims priority, application Germany August 22, 1955

7 Claims. (Cl. 260—343.2)

This invention relates to new and useful derivatives of 4-hydroxy-coumarin of the general formula

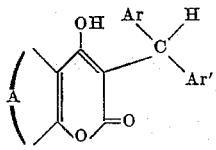

in which A is the residue yielding a coumarin and Ar or Ar' are the same or different aryl radicals.

It is known that derivatives of coumarin inhibit coagulation of human or animal blood and during the last years some of these compounds became very important as rodenticides or also in human medicine.

It is the principal object of this invention to find novel compounds being derived from 4-hydroxy-coumarins and useful in retarding blood coagulation. Another object is to find useful methods to prepare these compounds; further objects will become apparent as the following description proceeds.

In accordance with the present invention it has been found that 3-benzhydryl-substituted-4-hydroxy-coumarins of the above formula can be obtained by condensing 4-hydroxycoumarin or its derivatives substituted in the benzene nucleus, with benzhydrol or its nuclear-substituted products. From the following equation the reaction of coumarin itself with benzhydrol is to be seen; this equation is to be understood as an example for the general reaction between all substituted 4-hydroxycoumarins and possibly substituted derivatives of the benzhydrol.

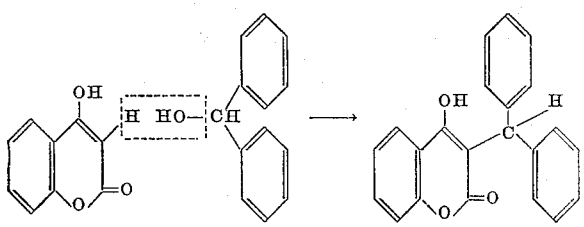

In addition to 4-hydroxycoumarin itself there may be used, for example, 6- or 7-chloro-4-hydroxycoumarin, 6- or 7-methyl-4-hydroxycoumarin, and 6- or 7-methoxy-4-hydroxy-coumarin. As benzhydrols, there may be used in addition to benzhydrol itself, for example, 4-chloro-benzhydrol, 4-methoxy-benzhydrol, 4,4'-dichloro-benzhydrol, 4,4'-dimethyl-benzhydrol or 4,4'-bis-(dimethyl-amino)-benzhydrol.

In accordance with the foregoing description the present invention refers preferably to compounds of the following formula

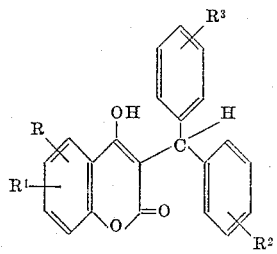

in which R and $R^1$ are same or different and stand for hydrogen, an alkyl group such as methyl, ethyl, propyl, butyl, an alkoxy group such as the methoxy group, the ethoxy group, the propyloxy group, a halogen such as chlorine or bromine, these substituents preferably being in the 6 and 7 positions of the coumarin systems; and in which $R^2$ and $R^3$ are also same or different and stand for hydrogen, an alkyl group as above defined, an alkoxy group, a dialkyl amino group such as dimethylamino, diethylamino, piperidino or morpholino group or a halogen such as chlorine or bromine, these substituents being preferably in the para position.

The condensation may be carried out by heating in a solvent with or without the addition of condensing agents capable of splitting off water such as sulphuric acid, zinc chloride, phosphoric acid, aluminium chloride and phosphorous pentoxide, or by heating the components in the melt with or without the addition of condensing agents. Generally the reaction may be carried out at temperatures from 50 to 250° C., especially temperatures from 100° to 150° C. are the best. As solvents there may be used inorganic solvents, preferably with higher boiling points, such as aliphatic hydrocarbons or aliphatic carboxylic acids, e. g. formic acid, acetic acid, propionic acid, etc. Purification of the reaction products is often unnecessary so that they may be worked up as obtained, for instance as a melt or after removal of the solvents by evacuation or pouring into water followed by filtration.

For purification, it is expedient to produce the alkali metal salts in an aqueous solution and precipitate them after filtration by addition of acid. Further purification may be effected by recrystallisation from an organic solvent. The products according to the invention are new; they retard or partially inhibit coagulation of human or animal blood. They may also find application as pest control agents. If used as rodenticides, the compounds of the present invention may preferably be used in aqueous solution for example 0.5 to 1% solution so that, e. g. rats are killed by drinking this solution; or they may be applied with baits, e. g. of potatoes, bread, etc. By mixing the hydroxycoumarins with flour, talcum or other usually applied inert materials powders or dusts can be obtained which are preferably scattered on the paths and lurking places used by rats, mice, etc. Sometimes it might be advisable to add flavours or other compounds to attract rodents.

The following examples are given for the purpose of illustrating the invention.

*Example 1*

8 parts by weight of 4-hydroxycoumarin are stirred with 9.5 parts by weight of benzhydrol in 25 parts by volume of glacial acetic acid and 1 part by volume of 30 percent sulphuric acid at 100° C. for 12 hours. The mixture is poured into water and the reaction product filtered off. For further purification, the product is taken up with benzene, the benzene solution extracted with 1 percent caustic soda solution, and the aqueous extract acidified with dilute hydrochloric acid. After recrystallisation from methanol, 3-benzhydryl-4-hydroxycoumarin is obtained having a melting point of 181–182° C.

By replacing the benzhydrol of the example by 11.5 parts by weight of 4-chloro-benzhydrol, 3-(4'-chloro-benzhydryl-)-4-hydroxycoumarin is obtained having a melting point of 187° C.

*Example 2*

9 parts by weight of 7-chloro-4-hydroxycoumarin and 9 parts by weight of benzhydrol are stirred in 25 parts by volume of glacial acetic acid and 1 part by volume of 30 percent sulphuric acid at 100° C. for 8 hours. The mixture is poured into water and the reaction product is filtered off. For purification, the product is taken up with ether, extracted with a 1 percent caustic soda solution, the extract is acidified and the crystalline precipitate filtered off. By recrystallisation from alcohol, 3-benzhydryl-7-chloro-4-hydroxy-coumarin is obtained having a melting point of 176–177° C.

By using the corresponding quantity of 4-chloro-benzhydrol in the example instead of benzhydrol, 3-(4'-chloro-benzhydryl)-7-chloro-4-hydroxycoumarin is obtained having a melting point of 176–178° C.

The 7-chloro-4-hydroxycoumarin may also be obtained by known methods, for instance, from 4-chloro-2-hydroxyacetophenone, by reacting it with carbonic acid diethyl ester and sodium, sodium ethylate or sodium hydride. It melts at 248–249° C. In the same way, 7-methyl-4-hydroxycoumarin is obtained from 4-methyl-2-hydroxy-acetophenone. Melting point 225–227° C.

*Example 3*

8 parts by weight of 7-methyl-4-hydroxycoumarin and 11 parts by weight of 4-chloro-benzhydrol are stirred in 25 parts by volume of glacial acetic acid and 1 part by volume of 30 percent sulphuric acid at 100° C. for 8 hours. After working up the mixture as described in Example 1, 3-(4'-chlorobenzhydryl)-7-methyl-4-hydroxycoumarin is obtained having a melting point of 161–162° C.

In a similar manner 3-benzhydryl-7-methyl-4-hydroxycoumarin is obtained having a melting point of 184–185° C.

*Example 4*

8 parts by weight of 4-hydroxycoumarin and 12 parts by weight of 4-chlorobenzhydrol are melted together and heated to 150° C. for 3 hours. The melt is taken up with benzene and further processed as described in Example 1. There is obtained 3-(4'-chlorobenzhydryl)-4-hydroxycoumarin having a melting point of 187° C.

*Example 5*

8 parts by weight of 4-hydroxycoumarin and 14 parts by weight of 4,4'-dichloro-benzhydrol are dissolved in 40 parts by volume of glacial acetic acid and 1 drop of 70 percent sulphuric acid is added. The solution is heated at 100° C. for 2 hours.

3-(4',4''-dichloro-benzhydryl-4-hydroxycoumarin) crystallizes on cooling; the product is filtered off and recrystallized from alcohol. Melting point 222–223° C.

In analogous manner there is obtained: 7-chloro-3-(4',4''-dichloro-benzhydryl)-4-hydroxycoumarin of the melting point 213–215° C. from 4,4'-dichloro-benzhydrol with 7-chloro-4-hydroxycoumarin; 6-chloro-3-(4',4''-dichloro-benzhydryl)-4-hydroxycoumarin of the melting point 223–224° C. with 6-chloro-4-hydroxycoumarin; 7-methyl-3-(4',4''-dichloro-benzhydryl)-4-hydroxycoumarin of the melting point 210–211° C. with 7-methyl-4-hydroxycoumarin; 6-methyl-3-(4',4''-dichloro-benzhydryl)-4-hydroxycoumarin of melting point 200–202° C. with 6-methyl-4-hydroxycoumarin; 7-methoxy-3-(4',4''-dichloro-benzhydryl)-4-hydroxycoumarin of the melting point 210–211° C. with 7-methoxy-4-hydroxycoumarin; 3-(4',4'' - bis - dimethylamino - benzhydryl-) - 4 - hydroxycoumarin, which is easily converted in the air into a blue dye-stuff, from 4-hydroxycoumarin and 4,4'-bis-dimethylamino-benzhydrol.

We claim:

1. Process for the production of 4-hydroxycoumarins which comprises condensing a 4-hydroxycoumarin with a benzhydrol at a temperature from about 50° C. to about 250° C.

2. A process as claimed in claim 1 wherein the reaction is carried out in the presence of a condensation agent capable of splitting off water.

3. A process as claimed in claim 2 wherein the reaction is carried out in an inert organic solvent.

4. A 4-hydroxy-3-benzhydryl-substituted coumarin of the following general formula

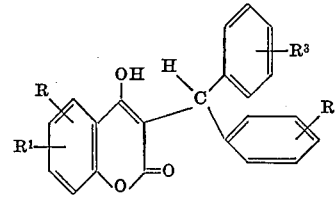

in which R and $R^1$ are members of the group consisting of hydrogen, lower alkyl radicals, lower alkoxy radicals, chlorine and bromine and $R^3$ and $R^4$ are members selected from the group consisting of hydrogen, lower alkyl, lower alkoxy, lower dialkylamino, chlorine and bromine.

5. 7-methyl-3-benzhydryl-4-hydroxycoumarin.

6. 6-chloro-3-benzhydryl-4-hydroxycoumarin.

7. 7 - chloro - 3 - (4',4'' - dichlorobenzhydryl) - 4 - hydroxycoumarin.

No references cited.